United States Patent
Fowe et al.

(10) Patent No.: US 10,643,462 B2
(45) Date of Patent: *May 5, 2020

(54) LANE LEVEL TRAFFIC INFORMATION AND NAVIGATION

(71) Applicant: HERE Global B.V., Eindhoven (NL)

(72) Inventors: James Fowe, Chicago, IL (US); Bruce Bernhardt, Chicago, IL (US); Filippo Pellolio, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,624

(22) Filed: Jul. 24, 2019

(65) Prior Publication Data
US 2019/0347930 A1   Nov. 14, 2019

Related U.S. Application Data

(63) Continuation of application No. 15/389,500, filed on Dec. 23, 2016, now Pat. No. 10,417,906.

(51) Int. Cl.
*G08G 1/01* (2006.01)
*G08G 1/065* (2006.01)
(Continued)

(52) U.S. Cl.
CPC ....... *G08G 1/0129* (2013.01); *G01C 21/3492* (2013.01); *G01C 21/3658* (2013.01);
(Continued)

(58) Field of Classification Search
CPC ............... G08G 1/0129; G08G 1/0112; G01C 21/3658; G01C 21/3492
See application file for complete search history.

(56) References Cited

U.S. PATENT DOCUMENTS

| 6,385,539 B1* | 5/2002 | Wilson | G01C 21/30 |
| | | | 340/905 |
| 6,850,841 B1 | 2/2005 | Casino | |

(Continued)

FOREIGN PATENT DOCUMENTS

| EP | 1804025 B1 | 9/2015 |
| WO | WO-2012/089282 A1 | 7/2012 |

OTHER PUBLICATIONS

Knoop, et al., "Single Frequency Precise Point Positioning: Obtaining a map accurate to lane-level." 16th International IEEE Conference on Intelligent Transportation Systems—(ITSC), 2013; Oct. 6-9, 2013; 7 pages.

(Continued)

*Primary Examiner* — Frederick M Brushaber
(74) *Attorney, Agent, or Firm* — Alston & Bird LLP

(57) ABSTRACT

A plurality of instances of probe data are received. Each instance is matched to a link of a digital map. A distance parameter for each instance is determined based on the link. A most likely lane for each instance is determined based on the corresponding distance parameter. Probe trajectories are constructed based on sequences of instances of probe data identified in the plurality of instances of probe data. At least one of the probe trajectories is analyzed based at least in part on lane change probabilities to generate at least one lane level trajectory. Lane level traffic information is determined based on the at least one lane level trajectory and the corresponding instances of probe data. At least a portion of the lane level traffic information, which is configured for use in performing at least one navigation-related function, is provided.

20 Claims, 7 Drawing Sheets

(51) Int. Cl.
*G01C 21/34* (2006.01)
*G01C 21/36* (2006.01)

(52) U.S. Cl.
CPC ......... *G08G 1/0112* (2013.01); *G08G 1/0141* (2013.01); *G08G 1/065* (2013.01)

(56) References Cited

U.S. PATENT DOCUMENTS

| | | | |
|---|---|---|---|
| 8,725,404 | B2 | 5/2014 | Kmiecik et al. |
| 9,500,486 | B2 | 11/2016 | Gale et al. |
| 9,547,986 | B1 | 1/2017 | Curlander et al. |
| 10,417,906 | B2 | 9/2019 | Fowe et al. |
| 2007/0109111 | A1* | 5/2007 | Breed .................. G01S 13/931 340/435 |
| 2007/0208501 | A1 | 9/2007 | Downs et al. |
| 2008/0004789 | A1 | 1/2008 | Horvitz et al. |
| 2009/0138497 | A1 | 5/2009 | Zavoli et al. |
| 2011/0313648 | A1 | 12/2011 | Newson et al. |
| 2012/0095682 | A1 | 4/2012 | Wilson |
| 2013/0282264 | A1 | 10/2013 | Bastiaensen et al. |
| 2014/0195138 | A1 | 7/2014 | Stelzig et al. |
| 2014/0278052 | A1* | 9/2014 | Slavin ................. G01C 21/3492 701/400 |
| 2014/0278055 | A1 | 9/2014 | Wang et al. |
| 2015/0170514 | A1 | 6/2015 | Stenneth |
| 2015/0262480 | A1 | 9/2015 | Fowe et al. |
| 2016/0046290 | A1* | 2/2016 | Aharony ............ G06K 9/00798 701/41 |
| 2016/0091609 | A1 | 3/2016 | Ismail et al. |
| 2016/0125734 | A1* | 5/2016 | Stenneth ................ G08G 1/056 340/935 |
| 2016/0167582 | A1* | 6/2016 | Chen .................. G06K 9/00798 348/148 |
| 2016/0171893 | A1* | 6/2016 | Chen .................... G01S 15/931 701/300 |
| 2017/0365166 | A1* | 12/2017 | Lu .................... G08G 1/096783 |
| 2018/0113450 | A1* | 4/2018 | Sherony ................ G08G 1/167 |
| 2018/0158325 | A1* | 6/2018 | Bernhardt .......... G01C 21/3415 |

OTHER PUBLICATIONS

Chen, Yihua, et al., "Probabilistic Modeling of Traffic Lanes from GPS Traces", Proceedings of 18th ACM SIGSPATIAL International Conference on Advances in Geographic Information Systems, Nov. 2-5, 2010, 8 pages, San Jose, CA, retrieved from <http://research.microsoft.com/en-us/um/people/jckrumm/Publications%202010/lane_structure_ACM-GIS2010.pdf > on Apr. 6, 2017.

Dao, Thanh, et al., "Markov-Based Lane-Positioning Using Inter-Vehicle Communication", IEEE Transaction on Intelligent Transportation Systems, 2007, pp. 641-650, vol. 8, retrieved from <http://citeseerx.ist.psu.edu/viewdoc/download?doi=10.1.1.120.5651&rep=rep1&type=pdf > on Apr. 6, 2017.

U.S. Appl. No. 15/370,311, "Automatic Detection of Lane Closures Using Probe Data", Unpublished (filed Dec. 6, 2016), (Bruce Bernhardt, Inventor) (Here Global B.V., assignee).

Wikipedia Contributors, 'Viterbi algorithm', Wikipedia, The Free Encyclopedia, Nov. 23, 2012 (first revision), retrieved from <https://en.wikipedia.org/wiki/Viterbi_algorithm> on Apr. 6, 2017.

U.S. Appl. No. 15/389,500, filed Dec. 23, 2016, 2018-0182238, Allowed.

European Patent Office, Extended European Search Report for Application No. 18175444.1, dated Nov. 14, 2018, 9 pages, Germany.

U.S. Patent and Trademark Office, Notice of Allowance for U.S. Appl. No. 15/389,500, 11 pages, U.S.

Office Action for U.S. Appl. No. 15/386,655 dated Feb. 7, 2019.

Office Action for U.S. Appl. No. 15/389,500 dated Dec. 31, 2018.

Notice of Allowance for U.S. Appl. No. 15/618,482 dated Jun. 6, 2019.

Office Action for U.S. Appl. No. 15/618,482 dated Jan. 25, 2019.

Office Action for U.S. Appl. No. 15/386,655 dated Jan. 2, 2020.

* cited by examiner

LANE LEVEL TRAFFIC INFORMATION AND NAVIGATION

CROSS-REFERENCE TO RELATED APPLICATIONS

This application claims priority to U.S. application Ser. No. 15/389,500, filed Dec. 23, 2016, the content of which is hereby incorporated by reference in its entirety.

TECHNOLOGICAL FIELD

An example embodiment relates generally to lane level traffic information/data for multi-lane road segments. An example embodiment relates generally to performing lane level navigation along multi-lane road segments based on lane level traffic information/data.

BACKGROUND

Generally, the location of a probe vehicle may be determined using a global navigation satellite system (GNSS), an example of which is the United States' global positioning system (GPS). Other examples of GNSS systems are GLONASS (Russia), Galileo (European Union) and Beidou/Compass (China), all systems having varying degrees of accuracy. Under good conditions, GPS provides a real-time location of a probe vehicle with a 95% confidence interval of 7.8 meters, according to the US government. Given that the width of many lanes is only 3 to 4 meters, this accuracy is not sufficient to determine the particular lane of a road segment in which a probe vehicle is traveling. As a result, determining lane level traffic information/data and/or performing lane level navigation is difficult.

BRIEF SUMMARY OF EXAMPLE EMBODIMENTS

At least some example embodiments are directed to determining lane level traffic information/data based on probe information/data. In an example embodiment, probe information/data may be received and a distance parameter corresponding to location information/data of the probe information/data may be determined. An instance of probe data may then be matched to a most likely lane based on a predetermined vehicle lane pattern and the distance parameter corresponding to the instance of probe data information/data. Sequences of probe information/data that corresponding to the same vehicle and/or probe apparatus are identified within the plurality of instances of probe information/data and used to construct probe trajectories. The probe trajectories may then be analyzed based on lane change probabilities to define a lane level trajectory that indicates a lane the vehicle was most likely traveling in when the corresponding instance of probe information/data was generated and/or provided. Thus, the instances of probe information/data of the sequence may be lane level map-matched. Based on the lane level trajectories, lane level traffic information/data may be determined. The lane level traffic information/data may then be used for lane level navigation, and/or the like.

In an example embodiment, a plurality of instances of probe data are received. Each instance of probe data being from a probe apparatus of a plurality of probe apparatuses. The probe apparatus comprises a plurality of sensors and is onboard a vehicle. An instance of the plurality of instances of probe data comprises location information indicating a location of the corresponding probe apparatus. Each instance of the plurality of instances of probe data are matched to a link of a digital map based at least in part on the location information. A distance parameter for each instance of the plurality of instances of probe data is determined based at least in part on the link and the location information. Based on a vehicle lane pattern for the link, a most likely lane for each instance of the plurality of instances is identified based on the corresponding distance parameter. One or more probe trajectories is constructed based on one or more sequences of instances of probe data identified from the plurality of instances of probe data. At least one of the one or more probe trajectories is analyzed based at least in part on lane change probabilities to generate at least one lane level trajectory. Lane level traffic information is determined based on the at least one lane level trajectory.

In accordance with an example embodiment, a method is provided that comprises receiving a plurality of instances of probe data. Each instance of probe data is provided by and/or received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. The method may further comprise, for each of one or more instances of the plurality of instances of probe data, determining a distance parameter based on the location information and a road segment corresponding to the location. The method may further comprise based on a vehicle lane pattern for the road segment, identifying a most likely lane for each instance of the plurality of instances based on the corresponding distance parameter. The method may further comprise constructing one or more probe trajectories based on one or more sequences of instances of probe data identified in the plurality of instances of probe data; and analyzing at least one of the one or more probe trajectories based at least in part on lane change probabilities to generate at least one lane level trajectory. The method may further comprise determining lane level traffic information based on the at least one lane level trajectory.

In an example embodiment, the location information is determined by a global navigation satellite system (GNSS) sensor onboard the vehicle. In an example embodiment, the distance parameter is determined by identifying a position on a link of a digital map corresponding to the road segment based on the location information; determining a distance between the position and the location; and assigning the distance parameter the value of the determined distance. In an example embodiment, the position is located on a reference line corresponding to the road segment and the distance is equal to the length of a line extending from the position to the location, wherein the line is perpendicular to the reference line. In an example embodiment, the reference line corresponds to the middle of the road segment.

In an example embodiment, each instance of probe data further comprises (a) a probe apparatus identifier configured to identify the probe apparatus and (b) a timestamp. In an example embodiment, each instance of probe data in a sequence of instances of probe data comprises a common probe identifier, and the sequence of instances of probe data is sequenced based on the time stamps of the instances of probe data in the sequence. In an example embodiment, analyzing the at least one of the one or more probe trajectories comprises generating a hidden Markov model based on the at least one of the one or more probe trajectories and the lane change probabilities; obtaining a Viterbi-path corresponding to the at least one of the one or more probe trajectories; and defining a lane level trajectory based on the Viterbi-path. In an example embodiment, the lane level traffic information comprises at least one of a lane specific representative travel speed, a lane specific distribution description of travel speed, a lane specific traffic volume measurement, a lane specific alert, lane specific traffic jam information, or a current lane for a particular vehicle.

In an example embodiment, the method further comprises providing a lane level traffic information notification to at least one computing entity. The lane level traffic information notification comprises at least a portion of the lane level traffic information and, when the lane level traffic notification is processed by the computing entity, the lane level traffic information notification causes the computing entity to (a) perform one or more route planning determinations, (b) provide a lane specific alert, or (c) both. In an example embodiment, a sequence of instances of probe data comprises at least three instances of probe data. In an example embodiment the most likely lane for an instance of probe data is determined based at least in part on representative distance parameters of the vehicle lane pattern and the distance parameter on the instance of probe data. In an example embodiment, the lane change probabilities are determined based on historical probe data or apriori data.

In accordance with an example embodiment, an apparatus is provided that comprises at least one processor, at least one memory storing computer program code, with the at least one memory and the computer program code configured to, with the processor, cause the apparatus to at least receive a plurality of instances of probe data. Each instance of probe data is provided by and/or received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. The at least one memory and the computer program code are further configured to, with the processor, cause the apparatus to, for each of one or more instances of the plurality of instances of probe data, determine a distance parameter based on the location information and a road segment corresponding to the location. The at least one memory and the computer program code are further configured to, with the processor, cause the apparatus to, based on a vehicle lane pattern for the road segment, identify a most likely lane for each instance of the plurality of instances based on the corresponding distance parameter. The at least one memory and the computer program code are further configured to, with the processor, cause the apparatus to construct one or more probe trajectories based on one or more sequences of instances of probe data identified in the plurality of instances of probe data; and analyze at least one of the one or more probe trajectories based at least in part on lane change probabilities to generate at least one lane level trajectory. The at least one memory and the computer program code are further configured to, with the processor, cause the apparatus to determine lane level traffic information based on the at least one lane level trajectory.

In an example embodiment, the location information is determined by a global navigation satellite system (GNSS) sensor onboard the vehicle. In an example embodiment, the at least one memory and the computer program code are further configured to, with the processor, cause the apparatus to determine the distance parameter by identifying a position on a link of a digital map corresponding to the road segment based on the location information; determine a distance between the position and the location; and assign the distance parameter the value of the determined distance. In an example embodiment, the position is located on a reference line corresponding to the road segment and the distance is equal to the length of a line extending from the position to the location, wherein the line is perpendicular to the reference line. In an example embodiment, the reference line corresponds to the middle of the road segment.

In an example embodiment, each instance of probe data further comprises (a) a probe apparatus identifier configured to identify the probe apparatus and (b) a timestamp. In an example embodiment, each instance of probe data in a sequence of instances of probe data comprises a common probe identifier, and the sequence of instances of probe data is sequenced based on the time stamps of the instances of probe data in the sequence. In an example embodiment, to analyze the at least one of the one or more probe trajectories the at least one memory and the computer program code configured to, with the processor, cause the apparatus to at least generate a hidden Markov model based on the at least one of the one or more probe trajectories and the lane change probabilities; obtain a Viterbi-path corresponding to the at least one of the one or more probe trajectories; and define a lane level trajectory based on the Viterbi-path. In an example embodiment, the lane level traffic information comprises at least one of a lane specific representative travel speed, a lane specific distribution description of travel speed, a lane specific traffic volume measurement, a lane specific alert, lane specific traffic jam information, or a current lane for a particular vehicle.

In an example embodiment, the at least one memory and the computer program code are further configured to, with the processor, cause the apparatus to provide a lane level traffic information notification to at least one computing entity. The lane level traffic information notification comprises at least a portion of the lane level traffic information and, when the lane level traffic notification is processed by the computing entity, the lane level traffic information notification causes the computing entity to (a) perform one or more route planning determinations, (b) provide a lane specific alert, or (c) both. In an example embodiment, a sequence of instances of probe data comprises at least three instances of probe data. In an example embodiment the most likely lane for an instance of probe data is determined based at least in part on representative distance parameters of the vehicle lane pattern and the distance parameter on the instance of probe data. In an example embodiment, the lane change probabilities are determined based on historical probe data or apriori data.

In accordance with an example embodiment, a computer program product is provided that comprises at least one non-transitory computer-readable storage medium having computer-executable program code instructions stored therein with the computer-executable program code instructions comprising program code instructions configured to receive a plurality of instances of probe data. Each instance of probe data is provided by and/or received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. The computer-executable program code instructions further comprise program code instructions configured to, for each of one or more instances of the plurality of instances of probe data, determine a distance parameter based on the location information and a road segment corresponding to the location. The computer-executable program code instructions further comprise program code instructions configured to, based on a vehicle lane pattern for the road segment, identify a most likely lane for each instance of the plurality of instances based on the corresponding distance parameter. The computer-executable program code instructions further comprise program code instructions configured to construct one or more probe trajectories based on one or more sequences of instances of probe data identified in the plurality of instances of probe data; and analyze at least one of the one or more probe trajectories based at least in part on lane change probabilities to generate at least one lane level trajectory. The computer-executable program code instructions further comprise program code instructions configured to determine lane level traffic information based on the at least one lane level trajectory.

In an example embodiment, the location information is determined by a global navigation satellite system (GNSS) sensor onboard the vehicle. In an example embodiment, the computer-executable program code instructions further comprise program code instructions configured to determine the distance parameter by identifying a position on a link of a digital map corresponding to the road segment based on the location information; determine a distance between the position and the location; and assign the distance parameter the value of the determined distance. In an example embodiment, the position is located on a reference line corresponding to the road segment and the distance is equal to the length of a line extending from the position to the location, wherein the line is perpendicular to the reference line. In an example embodiment, the reference line corresponds to the middle of the road segment.

In an example embodiment, each instance of probe data further comprises (a) a probe apparatus identifier configured to identify the probe apparatus and (b) a timestamp. In an example embodiment, each instance of probe data in a sequence of instances of probe data comprises a common probe identifier, and the sequence of instances of probe data is sequenced based on the time stamps of the instances of probe data in the sequence. In an example embodiment, the computer-executable program code instructions further comprise program code instructions configured to analyze the at least one of the one or more probe trajectories by generating a hidden Markov model based on the at least one of the one or more probe trajectories and the lane change probabilities; obtaining a Viterbi-path corresponding to the at least one of the one or more probe trajectories; and defining a lane level trajectory based on the Viterbi-path. In an example embodiment, the lane level traffic information comprises at least one of a lane specific representative travel speed, a lane specific distribution description of travel speed, a lane specific traffic volume measurement, a lane specific alert, lane specific traffic jam information, or a current lane for a particular vehicle.

In an example embodiment, the computer-executable program code instructions further comprise program code instructions configured to provide a lane level traffic information notification to at least one computing entity. The lane level traffic information notification comprises at least a portion of the lane level traffic information and, when the lane level traffic notification is processed by the computing entity, the lane level traffic information notification causes the computing entity to (a) perform one or more route planning determinations, (b) provide a lane specific alert, or (c) both. In an example embodiment, a sequence of instances of probe data comprises at least three instances of probe data. In an example embodiment the most likely lane for an instance of probe data is determined based at least in part on representative distance parameters of the vehicle lane pattern and the distance parameter on the instance of probe data. In an example embodiment, the lane change probabilities are determined based on historical probe data or apriori data.

In accordance with yet another example embodiment of the present invention, an apparatus is provided that comprises means for receiving a plurality of instances of probe data. Each instance of probe data is provided by and/or received from a probe apparatus of a plurality of probe apparatuses. The probe apparatus comprises a plurality of sensors and is onboard a vehicle. An instance of the plurality of instances of probe data comprises location information indicating a location of the corresponding probe apparatus. The apparatus further comprises means for, for each of one or more instances of the plurality of instances of probe data, determining a distance parameter based on the location information and a road segment corresponding to the location. The apparatus further comprises means for, based on a vehicle lane pattern for the road segment, identifying a most likely lane for each instance of the plurality of instances based on the corresponding distance parameter. The apparatus further comprises means for constructing one or more probe trajectories based on one or more sequences of instances of probe data identified in the plurality of instances of probe data. The apparatus further comprises means for analyzing at least one of the one or more probe trajectories based at least in part on lane change probabilities to generate at least one lane level trajectory. The apparatus further comprises means for determining lane level traffic information based on the at least one lane level trajectory.

BRIEF DESCRIPTION OF THE DRAWINGS

Figure 1:
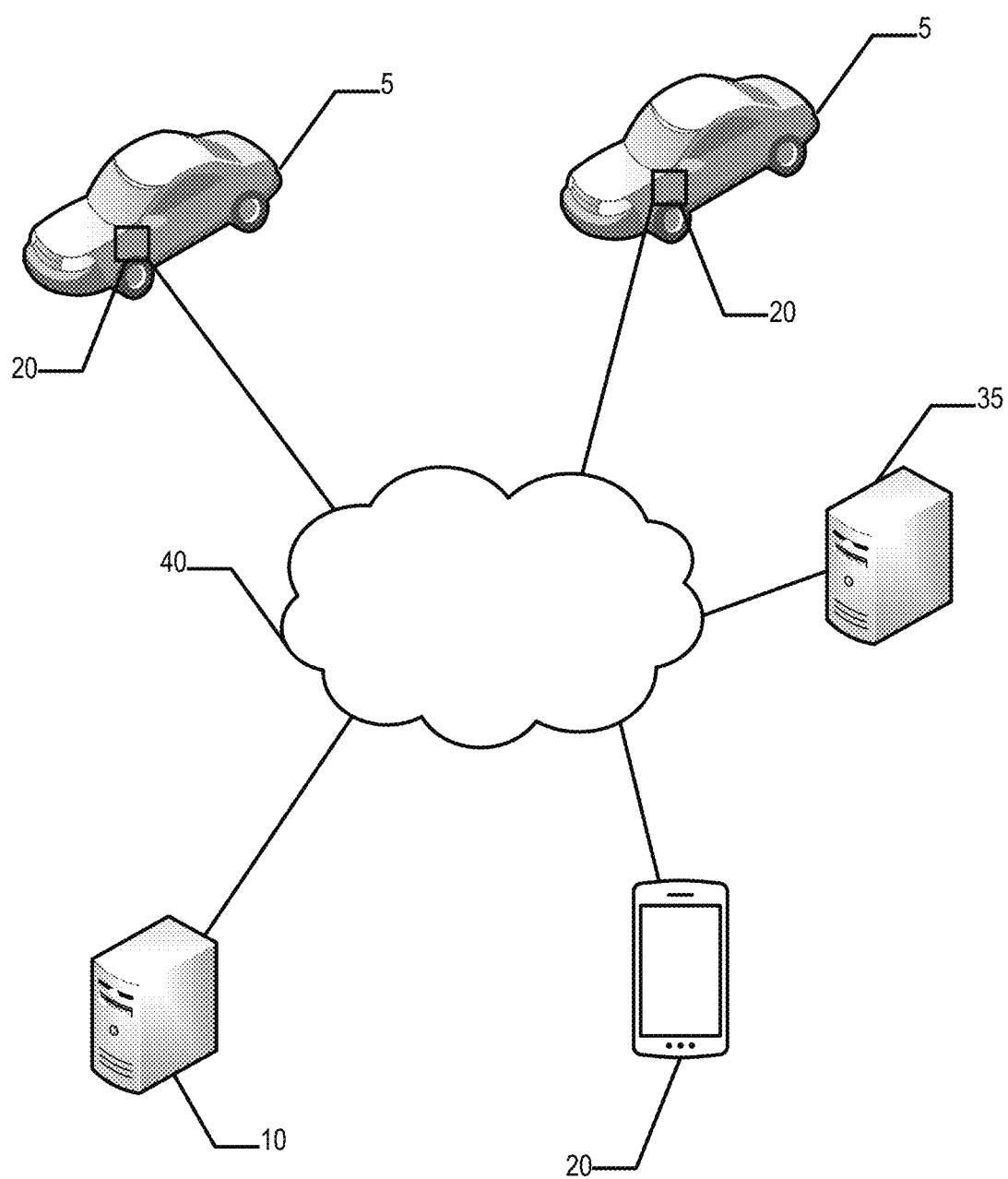
Figure 2A:
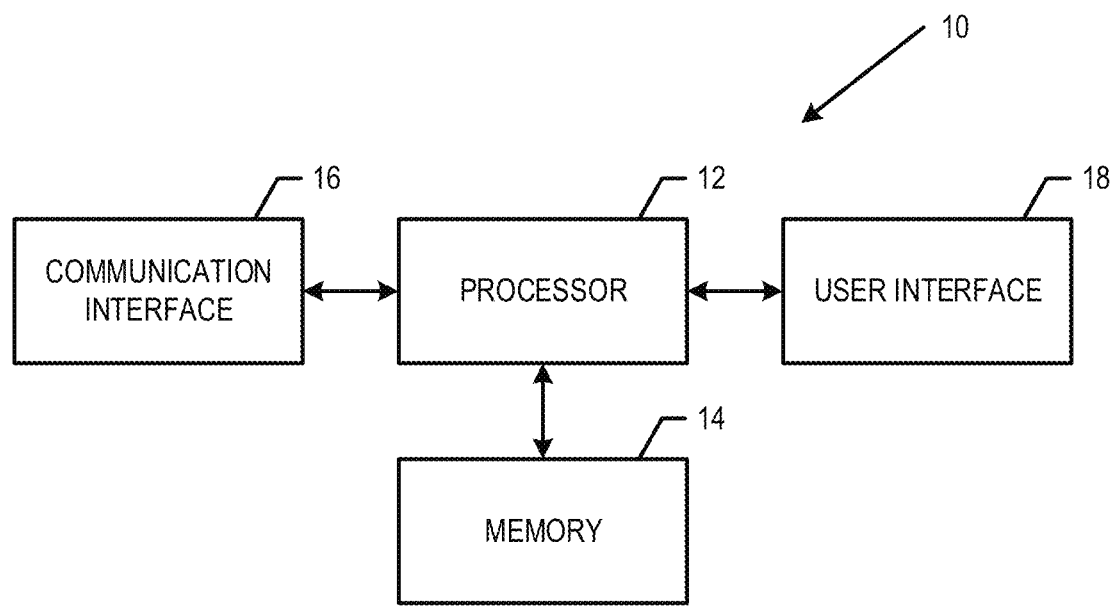
Figure 2B:
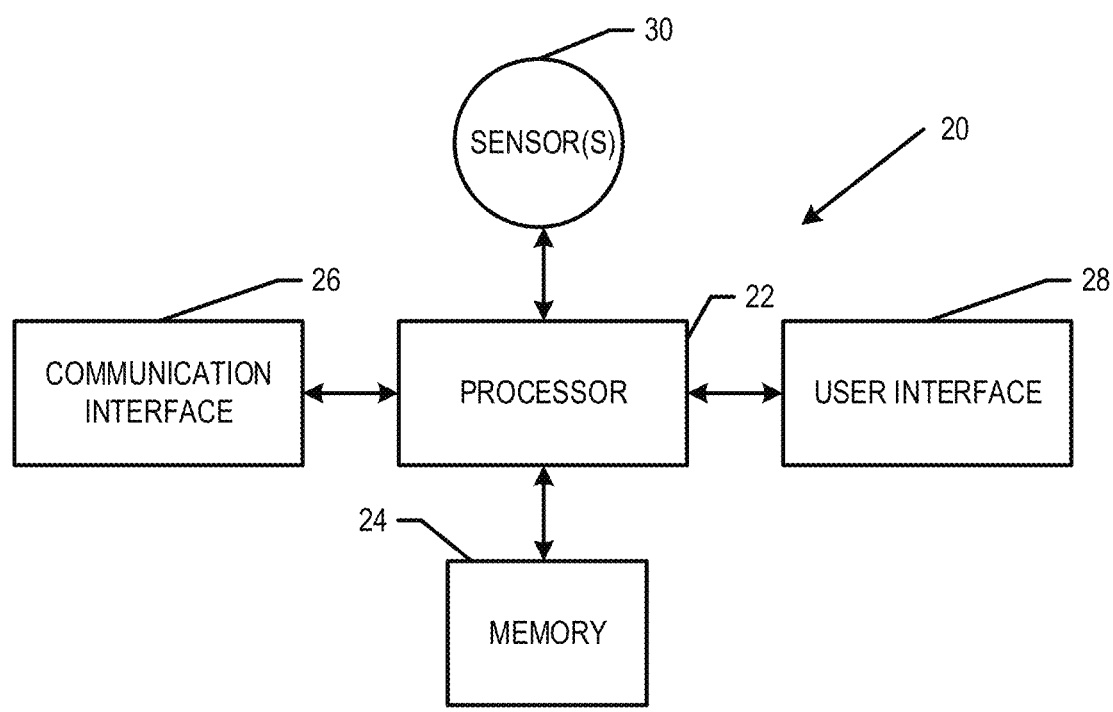
Figure 3:
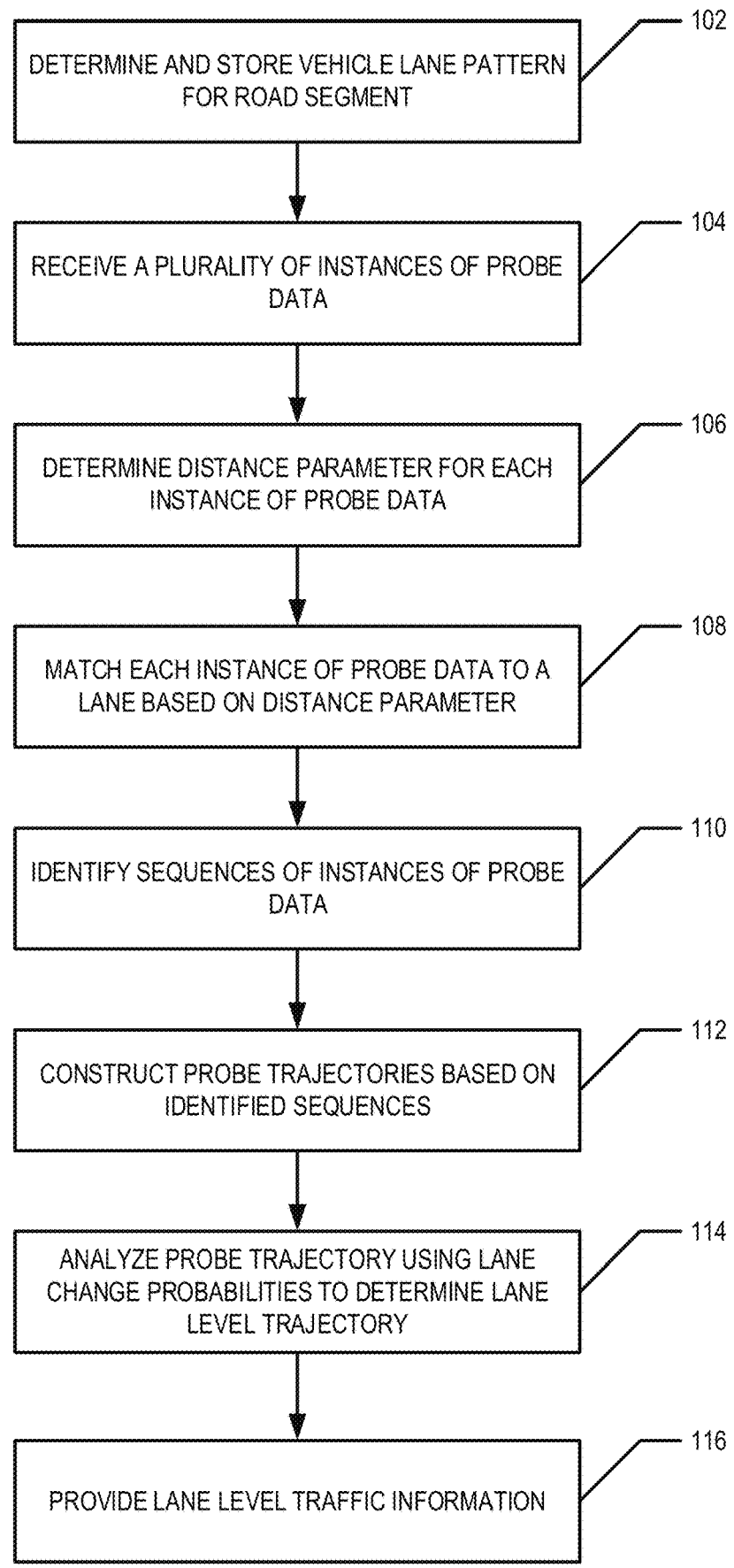
Figure 4:
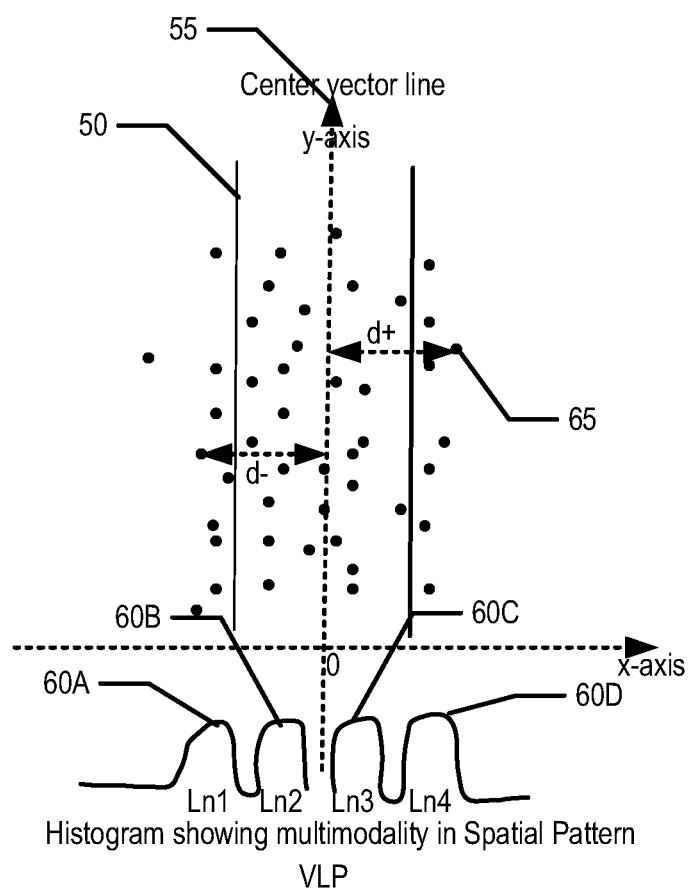
Figure 5:
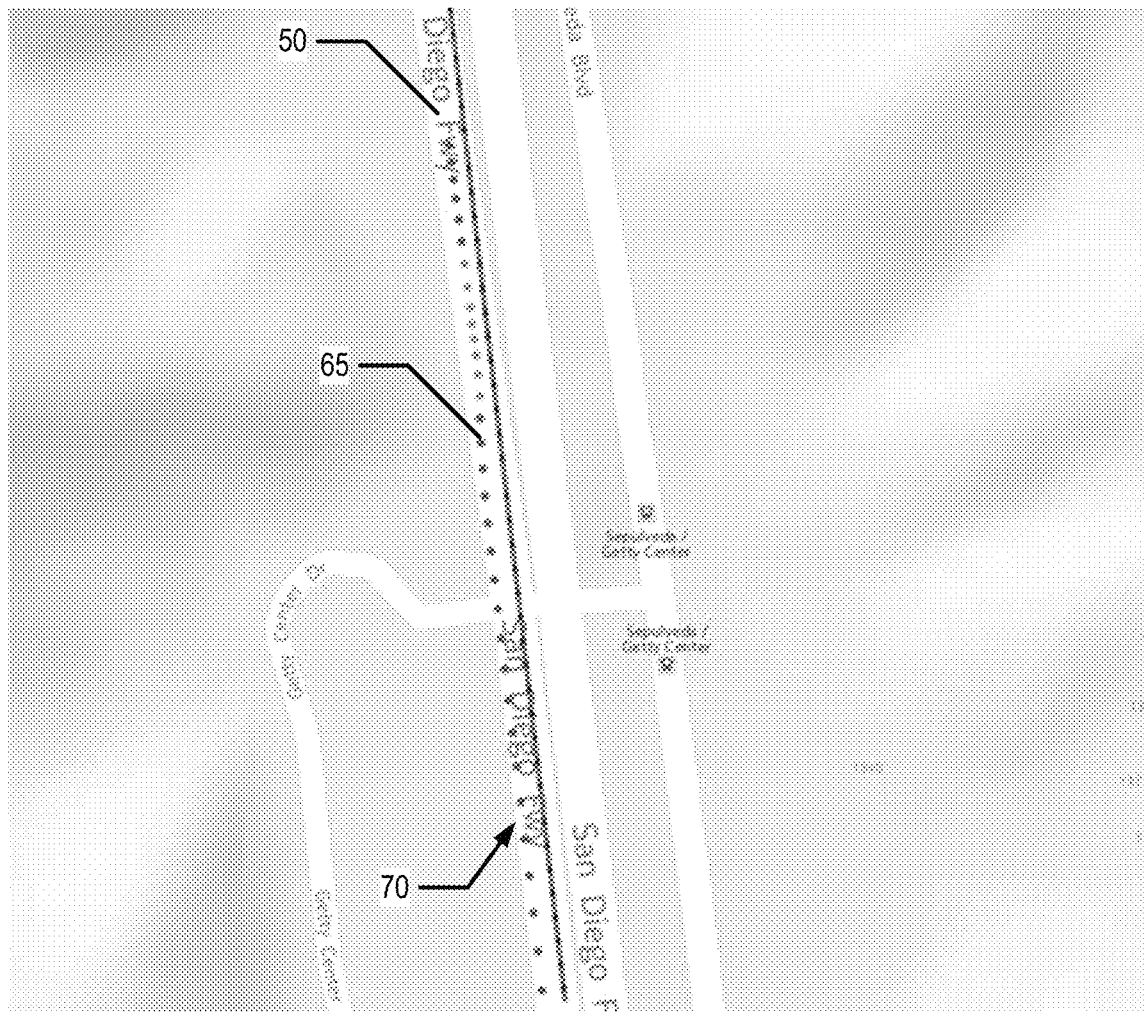
Figure 6:
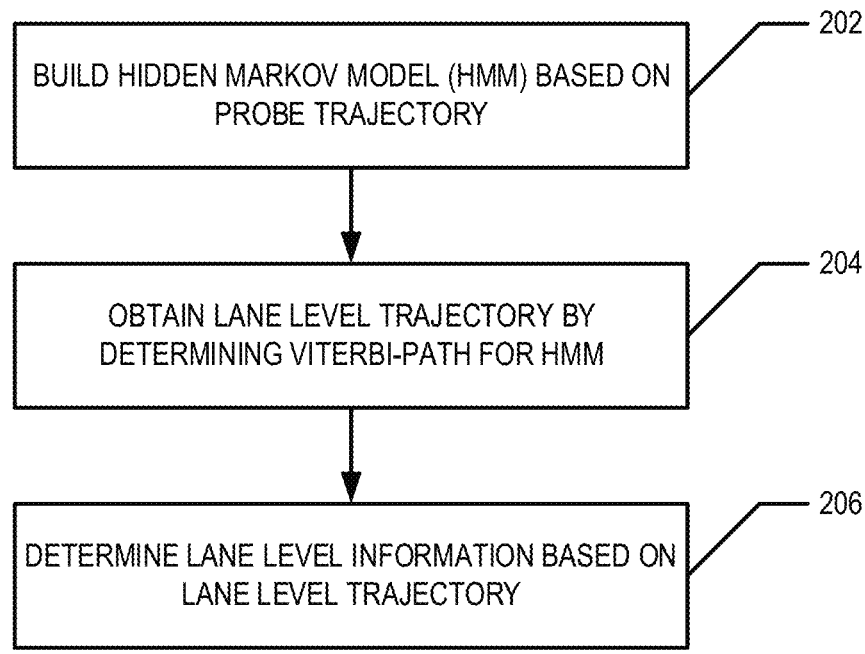
Figure 7:
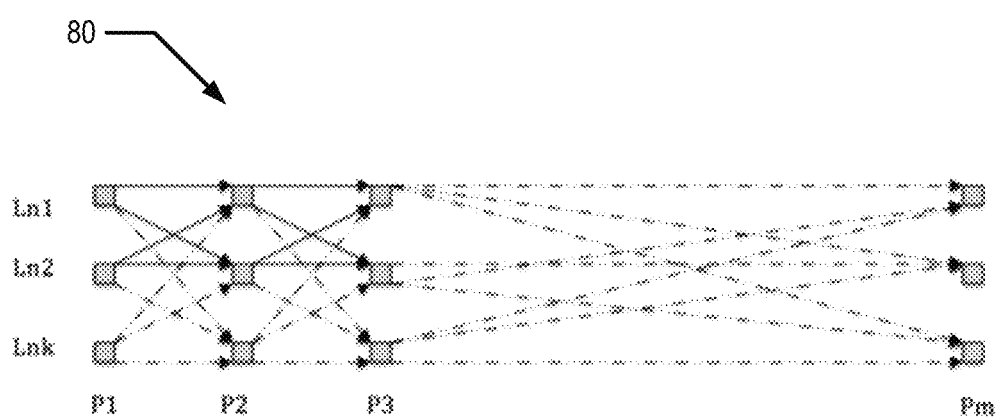

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an apparatus that may be specifically configured in accordance with an example embodiment;

FIG. 2B is a block diagram of a probe apparatus that may be specifically configured in accordance with an example embodiment;

FIG. 3 is a flowchart illustrating operations performed, such as by the apparatus of FIG. 2A to provide lane level traffic information/data, in accordance with an example embodiment;

FIG. 4 is a diagram of an example method of determining a vehicle lane pattern for a road segment, in accordance with an example embodiment;

FIG. 5 illustrates an example lane level trajectory, in accordance with an example embodiment;

FIG. 6 is a flowchart illustrating operations performed, such as by the apparatus of FIG. 2A to analyze a probe trajectory to determine a lane level trajectory, in accordance with an example embodiment; and FIG. 7 is an example diagram of a model that may be generated to analyze a probe trajectory, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

Methods, apparatus and computer program products are provided in accordance with an example embodiment in order to determine lane level traffic information/data. In some example embodiments, the lane level traffic information/data may be used to perform lane level navigation, route planning, and/or the like. For example, a plurality of instances of probe information/data may be received from probe apparatuses traveling along a road segment onboard vehicles. An instance of probe information/data may comprise location information/data. For example, the probe information/data may comprise a geophysical location (e.g., latitude and longitude) indicating the location of the probe apparatus at the time that the probe information/data is generated and/or provided (e.g., transmitted). In an example embodiment, an instance of probe information/data may comprise a probe identifier identifying the probe apparatus that generated and/or provided the probe information/data, a timestamp corresponding to when the probe information/data was generated, and/or the like. Based on the probe identifier and the timestamp a sequence of instances of probe information/data may be identified. For example, the instances of probe information of data corresponding to a sequence of instances of probe information/data may each comprise the same probe identifier. In an example embodiment, the instances of probe information/data in a sequence of instances of probe information/data are ordered based on the timestamps associated therewith. By analyzing a sequences of probe information/data indicating a vehicle traveling along a road segment in light of a vehicle lane pattern for the road segment, a lane level trajectory for the vehicle along at least a portion of the road segment may be determined. The lane level trajectory of a plurality of vehicles may be analyzed to provide lane level traffic information/data. The lane level traffic information/data may, in turn, be used for performing lane level navigation.

FIG. 1 provides an illustration of an example system that can be used in conjunction with various embodiments of the present invention. As shown in FIG. 1, the system may include a plurality of probe apparatuses 20, one or more apparatuses 10, one or more other computing entities 35, one or more networks 40, and/or the like. In various embodiments, the probe apparatus 20 may be an in vehicle navigation system, vehicle control system, a mobile computing device, and/or the like. For example, a probe apparatus 20 may be an in vehicle navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the probe apparatus 20 may be a smartphone, tablet, personal digital assistant (PDA), and/or other mobile computing device. In another example, the probe apparatus 20 may be a vehicle control system configured to autonomously drive a vehicle 5, assist in control of a vehicle 5, and/or the like. In example embodiments, a probe apparatus 20 is onboard a dedicated probe vehicle. In some embodiments, a probe apparatus 20 may be onboard a personal vehicle, commercial vehicle, public transportation vehicle, and/or other vehicle. In an example embodiment, a probe apparatus 20 is any apparatus that provides (e.g., transmits) probe information/data to the apparatus 10.

In an example embodiment, an apparatus 10 may comprise components similar to those shown in the example apparatus 10 diagrammed in FIG. 2A. In an example embodiment, the apparatus 10 is configured to provide map updates, traffic information/data, and/or the like to the probe apparatus 20 and/or computing entity 35. In an example embodiment, a probe apparatus 20 may comprise components similar to those shown in the example probe apparatus 20 diagrammed in FIG. 2B. In various embodiments, the apparatus 10 may be located remotely from the probe apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a probe apparatus 20 may be in communication with an apparatus 10 via the network 40. For example, the probe apparatus 20 may communicate with the apparatus 10 via a network, such as the Cloud. For example, the Cloud may be a computer network that provides shared computer processing resources and data to computers and other devices connected thereto. For example, the probe apparatus 20 may be configured to receive one or more map tiles of a digital map from the apparatus 10, traffic information/data (embedded in a map tile of a digital map or separate therefrom), and/or provide probe information/data to the apparatus 10.

In an example embodiment, as shown in FIG. 2B, the probe apparatus 20 may comprise a processor 22, memory 24, a communications interface 26, a user interface 28, one or more sensors 30 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; and/or other sensors that enable the probe apparatus 20 to determine one or more features of the corresponding vehicle's 5 surroundings), and/or other components configured to perform various operations, procedures, functions or the like described herein. In at least some example embodiments, the memory 24 is non-transitory.

Similarly, as shown in FIG. 2A, the apparatus 10 may comprise a processor 12, memory 14, a user interface 18, a communications interface 16, and/or other components configured to perform various operations, procedures, functions or the like described herein. In at least some example embodiments, the memory 14 is non-transitory. The computing entity 35 may comprise similar elements to the apparatus 10 and/or the probe apparatus 20. For example, the computing entity 35 may comprise a processor, memory, a user interface, a communications interface, and/or the like. In example embodiments, the computing entity 35 may comprise one or more sensors similar to sensor(s) 30. Certain example embodiments of the probe apparatus 20 and the apparatus 10 are described in more detail below with respect to FIGS. 2A and 2B.

II. Example Operation

In at least some example embodiments, probe information/data may be analyzed to determine lane level traffic information/data. In an example embodiment, the lane level traffic information/data may be used to perform various lane level navigation determinations, calculations, computations, and/or the like.

For example, a vehicle lane pattern may be established for a road segment and/or a link of a digital map corresponding to the road segment. In example embodiments, a vehicle lane pattern may comprise information regarding the number of lanes along the road segment, a lane identifier for each lane of the road segment, a representative distance parameter (e.g., mean, mode, median, average, and/or the like) for the road segment, a distribution description describing the distribution of distance parameters of vehicles traveling in the lane (e.g., a standard deviation of distance parameters of vehicles traveling in the lane, and/or the like), a width of the lane, a representative speed for the lane (e.g., mean, mode, median, average, free flow, and/or the like), a distribution description describing the distribution of speeds (e.g., standard deviation and/or the like), a day and/or time period for which the vehicle lane pattern is relevant, and/or the like. In an example embodiment, the vehicle lane pattern is established based on historical probe information/data. For example, the vehicle lane pattern may be established based on one, two, three, four, and/or the like days of historical probe information/data. In an example embodiment, the vehicle lane period may correspond to a particular day (or days) and time. For example, a vehicle lane pattern may correspond to and/or be relevant to traffic on Monday, Tuesday, Wednesday, and Thursdays from 5 to 5:30 pm. In another example, a vehicle lane pattern may correspond and/or be relevant to traffic on Saturdays from 1 to 3 pm. For example, if a road segment comprises a reversible lane, a shoulder lane, and/or the like that is only in use during a particular time period and/or on particular days, a vehicle lane pattern corresponding to road segment may be relevant to a particular day of the week and/or time of day. In example embodiments, a distance parameter may indicate the distance from a reference line of the road segment to position on a road segment indicated by the location information/data provided by an instance of probe information/data. Additional information/data regarding the distance parameter and determination thereof is provided elsewhere herein. Generally, as described herein the vehicle lane pattern, is pre-determined using historical probe information/data. The vehicle lane pattern may then be stored (e.g., in memory 14) in association with a link identifier configured to identify a digital map link corresponding to the road segment. In an example embodiment, the vehicle lane pattern may be determined in real-time or near real-time using, for example, real-time and/or near real-time probe information/data.

After the vehicle lane pattern is determined and/or stored (e.g., in memory 14), a plurality of instances of probe information/data are received. In an example embodiment, a probe apparatus 20 may provide (e.g., transmit) probe information/data to an apparatus 10. The probe information/data may comprise at least one of a probe identifier configured to identify the probe apparatus 20, a link identifier configured to identify the digital map link representing the road segment the probe apparatus 20 is travelling along, location information/data indicating a geophysical location of the probe apparatus 20 (e.g., determined by a location sensor 30), a travel speed of the probe apparatus 20 and/or the corresponding vehicle 5 travelling along at least a portion of the road segment, a timestamp, and/or the like. In example embodiments, the travel speed may be an instantaneous travel speed, an average travel speed over a short time interval (e.g., 10 seconds, 30 seconds, one minute, and/or the like), an average speed over a short distance interval (e.g., along the length of road segment, along a portion of the pre-intersection road segment, and/or the like). In example embodiments, the travel speed may be determined by one or more sensors 30 (e.g., GNSS, IMU, and/or the like), by the vehicle's 5 speedometer, and/or the like.

In an example embodiment, the probe information/data is analyzed in time bins. For example, the instances of probe information/data received during a one minute, five minute, ten minute, and/or other configurable time period may be binned together and/or analyzed together to determine lane level traffic information/data corresponding to the configurable time period. In particular, the time bins may be short enough that traffic conditions are generally similar across the configurable time period.

In an example embodiment, a plurality of instances of probe information/data (within a time bin) may be analyzed to identify sequences of probe information/data and determine a lane level trajectory for the sequence of probe information/data. A plurality of lane level trajectories may be determined based on a plurality of sequences of probe information/data. The plurality of lane level trajectories may then be used to determine lane level traffic information/data. In an example embodiment, lane level traffic information/data may comprise an average travel speed, traffic volume, lane specific alerts, and/or the like for one or more lanes of a road segment. In an example embodiment, lane level traffic information/data may comprise information/data indicating the current lane a particular vehicle 5 is traveling in. For example, the lane level traffic information/data provided to a particular probe apparatus 20 and/or computing entity 35, may comprise information/data indicating that the vehicle 5 corresponding to the particular probe apparatus 20 and/or computing entity 35 is traveling in Lane 3. The particular probe apparatus 20 and/or computing entity 35 may then use the lane determination for the vehicle 5 to perform one or more lane level navigation determinations, calculations, computations, and/or the like.

In an example embodiment, a distance parameter for each instance of the plurality of instances of probe information/data may be determined. For example, the distance parameter d may be determined by determining the distance between (a) the location indicated by the location information/data of an instance of probe information/data and (b) a reference line of a road segment. In an example embodiment, the reference line of a road segment may be a center line of the road segment, a right hand edge of the road segment, a left hand edge of the road segment, and/or another reference line of the road segment. In an example embodiment, the distance parameter d may indicate a relative position of the location information/data relative to the road segment and/or the reference line.

In an example embodiment, each instance of probe information/data may then be matched to a lane based on the distance parameter d determined for that probe information/data. For example, if a distance parameter d for a first instance of probe information/data is determined to be 2.3 meters and the vehicle lane pattern for the corresponding road segment has two lanes with the representative distance parameters of 2.0 meters for Lane 1 and 4.5 meters for Lane 2, the first instance of probe information/data is matched to Lane 1. In an example embodiment, the probability of the vehicle 5 having the distance parameter d being in each lane is determined. For example, the probability that distance parameter d for the first instance of probe information/data corresponds to the corresponding vehicle 5 traveling in Lane 1 may be 85% and the probability that the distance parameter d for the first instance of probe information/data corresponds to the corresponding vehicle 5 traveling in Lane 2 may be 10%. In an example embodiment, the probability that a distance parameter d corresponds to a particular lane may be determined based on the representative distance parameter for the lane and the distribution description for the lane. In another example embodiment, a normalized probability of the vehicle 5 having the distance parameter d being in each lane is determined. For example, the normalized probability that distance parameter d for the first instance of probe information/data corresponds to the corresponding vehicle 5 traveling in Lane 1 may be 89% and the normalized probability that the distance parameter d for the first instance of probe information/data corresponds to the corresponding vehicle 5 traveling in Lane 2 may be 11%. As should be understood, the sum of the normalized probabilities is 100%.

In an example embodiment, a one or more sequences of instances of probe information/data may be identified. In an example embodiment, a sequence of instances of probe information/data may consist of probe information/data that comprises the same probe identifier. For example a sequence of instances probe information/data may be identified based on matching instances of probe information/data comprising the same probe identifier. In an example embodiment, the sequence of instances of probe information/data may be ordered based on the timestamp associated with each instance of probe information/data. Thus, for a first probe identifier, it may be determined that at time $t_1$ an instance of probe information/data corresponding to the first probe identifier was matched to Lane 1, at time $t_2$ an instance of probe information/data corresponding to the first probe identifier was matched to Lane 1, and at time $t_3$ an instance of probe information/data corresponding to the first probe identifier was matched to Lane 2. Thus, a probe trajectory corresponding to a particular probe apparatus 20 and/or vehicle 5 may be generated and/or determined based on the corresponding sequence of instances of probe information/data that has been matched to lanes of the road segment. In example embodiments, a probe trajectory may correspond to three or more instances of probe information/data.

As previously noted, the accuracy of various GNSS systems may not be sufficient to locate a particular vehicle 5 to a particular lane. For example, the noise within a GNSS reading may cause consecutive instances of probe information/data in a sequence of instances of probe information/data to be matched to different lanes, even if the vehicle 5 travels in the same lane throughout the sequence. For example, a sequence of five instances of probe information/data may lead to a probe trajectory of Lane 1, Lane 2, Lane, 1, Lane 2, Lane 1. However, if the time or distance between the capturing of the instances of probe information/data is short (e.g., a few seconds, a few meters and/or the like), it is unlikely that the vehicle 5 is continuously changing lanes. Therefore, the probe trajectory may be analyzed based at least in part on the probability of a lane change during the time/distance between consecutive instances of probe information/data to determine a lane level trajectory corresponding to the vehicle 5. In an example embodiment, the probability of a lane change during the time/distance between consecutive instances of probe information/data may be determined based on historical probe information/data, apriori information/data, and/or the like. In an example embodiment, the probability of a lane change during a short time/distance interval between consecutive instances of probe information/data may be smaller than the probability of a lane change during a long time/distance interval between consecutive instances of probe information/data.

The lane level trajectory corresponding to one or more sequences of instances of probe information/data may be determined. For example, the lane level trajectory corresponding to one or more vehicles 5 may be determined. Based on the one or more lane level trajectories, lane level traffic information/data may be determined, generated, and/or the like. For example, lane level speed, lane level volume, and/or the like may be determined for one or more lanes of the road segment based on the determined lane level trajectories. The lane level traffic information/data may then be provided to one or more computing entities 35, stored for later use (e.g., in memory 14), and/or the like.

After and/or responsive to determining, and/or the like lane level traffic information/data for one or more lanes of the road segment, a lane level traffic information/data notification may be provided to one or more computing entities 35. In an example embodiment, the lane level traffic information/data notification may comprise at least a portion of the determined lane level traffic information/data. In an example embodiment, the lane level traffic information/data notification comprises an updated map tile, a traffic information/data map tile layer, and/or the like. For example, a computing entity 35 may be a probe apparatus 20 (e.g., corresponding to a vehicle 5 that is approaching the road segment, expected to travel along the road segment on a current trip or an expected trip, currently travelling along the road segment, and/or the like) or a traffic management apparatus. For example, the computing entity 35 may be a traffic management apparatus that is operated by and/or on behalf of a traffic management agency (e.g., a local department of transportation, city traffic management office, and/or the like). In example embodiments, the lane level traffic information/data may comprise computer-executable code and/or reference computer-executable code that, when executed by the computing entity 35 may cause the computing entity 35 to provide one or more lane level alerts through a user interface thereof (e.g., a display, audible alert, and/or the like). For example, the speed of traffic in Lane 1 may be considerably slower than the traffic in Lanes 2 and 3 at a location a short distance ahead of the vehicle's 5 current location. Thus, a lane level alert may be provided indicating that the speed of traffic in Lane 1 is considerably slower than the traffic in Lanes 2 and 3 ahead. Various lane level alerts may be provided, as appropriate for the application. In an example embodiment, the computing entity 35 may, responsive to receiving the lane level traffic information/data notification and/or in response to executing the computer-executable therein and/or referenced thereby, perform one or more lane level navigation tasks based on the lane level traffic information/data. For example, one or more route planning computations, determinations, and/or the like may be performed that take into account the lane level traffic information/data and provide lane level directions and/or determinations for the route. For example, a route planning computation, determination, and/or the like may comprise re-calculating a route, determining an updated travel and/or expected arrival time, and/or the like.

Determining Lane Level Traffic Information/Data

FIG. 3 provides a flowchart illustrating processes and procedures that may be completed, for example by an apparatus 10, to determine and/or provide lane level traffic information/data. In an example embodiment, the lane level traffic information/data may be used to perform lane level navigation. In an example embodiment, lane level traffic information/data may comprise a lane specific representative travel speed (e.g., an average travel speed) for one or more lanes of the road segment, a lane specific distribution description (e.g., standard deviation) of travel speed, a lane specific traffic volume measurement, lane specific alerts, lane specific traffic jam information/data, and/or the like for one or more lanes of the road segment. In an example embodiment, lane level traffic information/data may comprise information/data indicating the current lane a particular vehicle 5 is traveling in (e.g., as of the last instance of probe information/data provided by the probe apparatus 20 onboard the particular vehicle 5). In an example embodiment, the lane level traffic information/data may be determined in real-time or near real-time. In one example embodiment, lane level traffic information/data may be determined using historical probe information/data.

Starting at block 102, a vehicle lane pattern for a road segment is determined. For example, the apparatus 10 may determine a vehicle lane pattern for the road segment. For example, the apparatus 10 may comprise means, such as the processor 12 and/or the like, for determining a vehicle lane pattern for the road segment. In an example embodiment, the vehicle lane pattern may be determined based on historical probe information/data. For example, the vehicle lane pattern may be determined based on one to four days of historical probe information/data. In example embodiments, a vehicle lane pattern may comprise information regarding the number of lanes along the road segment, a lane identifier for each lane of the road segment, a representative distance parameter (e.g., mean, mode, median, average, and/or the like) for the road segment, a distribution description describing the distribution of distance parameters of vehicles traveling in the lane (e.g., a standard deviation of distance parameters of vehicles traveling in the lane, and/or the like), a width of the lane, a representative speed for the lane (e.g., mean, mode, median, average, free flow, and/or the like), a distribution description describing the distribution of speeds (e.g., standard deviation and/or the like), a day and/or time period for which the vehicle lane pattern is relevant, and/or the like. In an example embodiment, the vehicle lane pattern is established based on historical probe information/data. For example, the vehicle lane pattern may be established based on one, two, three, four, and/or the like days of historical probe information/data. In an example embodiment, the vehicle lane period may correspond to a particular day (or days) and time. For example, a vehicle lane pattern may correspond to and/or be relevant to traffic on Monday, Tuesday, Wednesday, and Thursdays from 5 to 5:30 pm. In another example, a vehicle lane pattern may correspond and/or be relevant to traffic on Saturdays from 1 to 3 pm. For example, if a road segment comprises a reversible lane, a shoulder lane, and/or the like that is only in use during a particular time period and/or on particular days, a vehicle lane pattern corresponding to road segment may be relevant to a particular day of the week and/or time of day. In example embodiments, a distance parameter may indicate the distance from a reference line of the road segment to position on a road segment indicated by the location information/data provided by an instance of probe information/data. Additional information/data regarding the distance parameter and determination thereof is provided elsewhere herein. Generally, as described herein the vehicle lane pattern, is pre-determined using historical probe information/data. In an example embodiment, the vehicle lane pattern may be determined in real-time or near real-time using, for example, real-time and/or near real-time probe information/data.

In an example embodiment, the vehicle lane pattern may be determined using a clustering technique. For example, a vehicle lane pattern may be determined using a technique similar to that described in co-pending U.S. application Ser. No. 15/370,311, filed Dec. 6, 2016, which is hereby incorporated in its entirety by reference. In an example embodiment, a k-means clustering technique may be used to cluster instances of probe information/data based on the corresponding distance parameters. As should be understood, various clustering techniques may be used in various embodiments to cluster instances of probe information/data based on the corresponding distance parameter to determine a vehicle lane pattern for a road segment. FIG. 4 illustrates a plurality of locations 65 along a road segment 50 that each correspond to an instance of probe information/data. A distance parameter d may indicate the distance from a reference line 55 of the road segment. By clustering the instance of probe information/data based on the distance parameters d, the clusters 60A, 60B, 60C, and 60D are identified and/or determined. Clusters 60A, 60B, 60C, and 60D each correspond to a lane of traffic along the road segment 50. Once a vehicle lane pattern is determined, the vehicle lane pattern may be stored (e.g., by memory 14) for later use.

Returning to FIG. 3, at block 104, a plurality of instances of probe information/data are received. For example, after the vehicle lane pattern is determined and/or stored, a plurality of instances of probe information/data are received. For example, the apparatus 10 may receive a plurality of instances of probe information/data. Each instance of probe information/data may be provided by a probe apparatus 20 onboard a vehicle 5. For example, the apparatus 10 may comprise means, such as processor 12, communications interface 16, and/or the like, for receiving a plurality of instances of probe information/data. In an example embodiment, the probe information/data may comprise at least one of a probe identifier configured to identify the probe apparatus 20, a link identifier configured to identify the digital map link representing the road segment the probe apparatus 20 is travelling along, a location information/data (e.g., comprising a geophysical location of the probe apparatus 20 and determined by a location sensor 30), a travel speed of the probe apparatus 20 and/or the corresponding vehicle 5 travelling along at least a portion of the road segment, a timestamp corresponding to the probe information/data, and/or the like. In an example embodiment, the probe information/data is analyzed in time bins. For example, the instances of probe information/data received during a one minute, five minute, ten minute, and/or the like configurable time period may be binned together and/or analyzed together. In particular, the configurable time period of the time bins may be determined such that traffic conditions throughout the time bin are expected to be generally static. For example, the traffic conditions of the road segment may be approximately constant over a configurable time period equal to the temporal length of the time bin.

At block 106, a distance parameter d is determined based for one or more instances of the plurality of instances of probe information/data. In an example embodiment, the distance parameter d is determined based on the location information/data corresponding to the instance of probe information/data. For example, the apparatus 10 may determine a distance parameter d for each instance of the plurality of instances of probe information/data based on the location information/data corresponding to instances of probe information/data. For example, the apparatus 10 may comprise means, such as the processor 12 and/or the like, for determining a distance parameter d for each instance of the plurality of instances of probe information/data. In an example embodiment, the distance parameter d corresponding to an instance of probe information/data may be defined by the distance between (a) the location indicated by the location information/data of the instance of probe information/data and (b) a reference line of a road segment. In an example embodiment, the reference line of a road segment may be a center line of the road segment, a right hand edge of the road segment, a left hand edge of the road segment, and/or another reference line of the road segment. In an example embodiment, the distance parameter d may indicate a relative position of the location information/data relative to the road segment and/or the reference line. For example, as shown in FIG. 4, the distance parameter d may be the distance between the location 65 corresponding to the location information/data of the instance of probe information/data and the reference line 55. In an example embodiment, the distance parameter d corresponding to an instance of probe information/data may be determined by map matching the location information/data of the instance of probe information/data to the digital map. For example, the location information/data may be used to identify a position (e.g., latitude and longitude) along a link of a digital map representing a road segment the probe apparatus 20 and/or vehicle 5 is travelling along. The link may be defined by a line in latitude and longitude space. In an example embodiment, this line may be used as the reference line for the road segment. Thus, in an example embodiment, the distance parameter d may be determined, computed, and/or the like by identifying a position along the link (e.g., a map-matched position) corresponding to the location information/data and then determining the distance from the position along the link (e.g., the map-matched position) to the location indicated by the location information/data. For example, the distance parameter $d_1$ corresponding to instance i of the probe information/data may be determined, computed, and/or the like by $d_1$=Distance (position (map-match), location (location information/data)). In various embodiments, the distance parameter $d_1$ corresponding to instance i of probe information/data may be determined based on the corresponding location information/data using a variety of techniques. Additionally, it should be understood that the terms location and position are used interchangeably herein.

At block 108, one or more instances of the plurality of instances of probe information/data is matched to a lane of the road segment. For example, the relevant vehicle lane pattern may be accessed (e.g., from memory 14 by the processor 12). The relevant vehicle lane pattern may then be used to match an instance of probe information/data to a lane of the road segment based on the corresponding distance parameter d and the representative distance parameters of the lanes and/or the distribution description corresponding to the lanes of the vehicle lane pattern. As noted above, a vehicle lane pattern may be relevant to a particular time of day, day of week, weather condition, and/or the like.

For example, an apparatus 10 may match each instance of probe information/data to a lane of the road segment based on the relevant vehicle lane pattern and the distance parameter d corresponding to the instance of probe information/data. For example, an apparatus 10 may comprise means, such as the processor 12 and/or the like, for matching each instance of probe information/data to a lane of the road segment based on the relevant vehicle lane patter and the distance parameter d corresponding to the instance of probe information/data. For example, if a distance parameter d for a first instance of probe information/data is determined to be 2.3 meters and the vehicle lane pattern for the corresponding road segment has two lanes with the representative distance parameters of 2.0 meters for Lane 1 and 4.5 meters for Lane 2, the first instance of probe information/data may be matched to Lane 1. In an example embodiment, one or more lane probabilities and/or normalized lane probabilities may be determined in addition to and/or in place matching the instance of probe information/data to a lane. In an example embodiment, a lane probability is the probability that a vehicle 5 having the distance parameter d is traveling in a particular lane. In an example embodiment, a normalized lane probability is a probability that has been normalized such that the total probability of the vehicle 5 being in a lane of the road segment, as defined by the vehicle lane patter, is 100%. For example, the probability that distance parameter d for the first instance of probe information/data corresponds to the corresponding vehicle 5 traveling in Lane 1 may be 85% and the probability that the distance parameter d for the first instance of probe information/data corresponds to the corresponding vehicle 5 traveling in Lane 2 may be 10%. For example, the normalized probability that distance parameter d for the first instance of probe information/data corresponds to the corresponding vehicle 5 traveling in Lane 1 may be 89% and the normalized probability that the distance parameter d for the first instance of probe information/data corresponds to the corresponding vehicle 5 traveling in Lane 2 may be 11%. In an example embodiment, the probability that a distance parameter d corresponds to a particular lane may be determined based on the representative distance parameter for the lane and/or the distribution description for the lane.

At block 110, one or more sequences of probe information/data may be identified. For example, the apparatus 10 may identify one or more sequences of probe information/data. For example, the apparatus 10 may comprise means, such as processor 12 and/or the like, for identifying one or more sequences of probe information/data. In an example embodiment, a sequence of instances of probe information/data may consist of probe information/data that comprises the same probe identifier. For example a sequence of instances probe information/data may be identified based on matching instances of probe information/data comprising the same probe identifier. In an example embodiment, the sequence of instances of probe information/data may be ordered based on the timestamp associated with each instance of probe information/data.

At block 112, one or more probe trajectories are constructed, built, generated, and/or the like based on the one or more sequences of probe information/data. For example, a probe trajectory may comprise the matched lane and/or lane probabilities for each instance of probe information/data for a sequence of probe information/data. In an example embodiment, the probe trajectory may comprise information/data regarding the time/distance interval between consecutive instances of probe information/data provided by the probe apparatus 20 corresponding to the probe trajectory. For example, the apparatus 10 may construct, build, generate, and/or the like one or more probe trajectories. For example, the apparatus 10 may comprise means, such as the processor 12 and/or the like, for constructing, building, generating, and/or the like one or more probe trajectories. For example, for one or more instances of probe information/data comprising a first probe identifier, it may be determined that at time $t_1$ an instance of probe information/data corresponding to the first probe identifier was matched to Lane 1, at time $t_2$ an instance of probe information/data corresponding to the first probe identifier was matched to Lane 1, and at time $t_3$ an instance of probe information/data corresponding to the first probe identifier was matched to Lane 2. The times $t_1$, $t_2$, and $t_3$ are determined based on the timestamp associated with the corresponding instance of probe information/data. Thus, a probe trajectory corresponding to a particular probe apparatus 20 and/or vehicle 5 may be generated and/or determined based on the corresponding sequence of instances of probe information/data that has been matched to lanes of the road segment. In example embodiments, a probe trajectory may correspond to three or more instances of probe information/data.

At block 114, at least one probe trajectory may be analyzed using lane change probabilities to determine a lane level trajectory. For example, the apparatus 10 may analyze each probe trajectory using lane change probabilities to determine a lane level trajectory corresponding to the probe trajectory, probe identifier, and/or corresponding probe apparatus 20. For example, the apparatus 10 may comprise means, such as the processor 12 and/or the like, for analyzing each probe trajectory using lane change probabilities to determine a lane level trajectory corresponding to the probe trajectory, probe identifier, and/or corresponding probe apparatus 20. For example, the noise within a GNSS reading may cause consecutive instances of probe information/data in a sequence of instances of probe information/data to be matched to different lanes, even if the vehicle 5 travels in the same lane throughout the sequence. For example, a sequence of five instances of probe information/data may lead to a probe trajectory of Lane 1, Lane 2, Lane, 1, Lane 2, Lane 1. However, if the time or distance between the capturing of the instances of probe information/data is short (e.g., a few seconds, a few meters and/or the like), it is unlikely that the vehicle 5 is continuously changing lanes. Therefore, the probe trajectory may be analyzed based at least in part on the probability of a lane change during the time/distance between consecutive instances of probe information/data to determine a lane level trajectory corresponding to the vehicle 5. In an example embodiment, the probability of a lane change during the time/distance between consecutive instances of probe information/data may be determined based on historical probe information/data, apriori information/data, and/or the like. In an example embodiment, the probability of a lane change during a short time/distance interval between consecutive instances of probe information/data may be smaller than the probability of a lane change during a long time/distance interval between consecutive instances of probe information/data. In an example embodiment, the lane change probabilities used to analyze the probe trajectories may be determined, selected, and/or the like, based on the number of lanes of the road segment, the class of the road segment (e.g., highway, arterial, local street, and/or other road type classification), a route being driven by the vehicle 5 that the probe apparatus 20 corresponding to the probe trajectory is onboard, the time of day and/or day of the week, the time/distance interval between consecutive instances of probe information/data, and/or the like. In an example embodiment, a lane level trajectory is the path most likely taken by a probe apparatus 20 and/or vehicle corresponding to the lane level trajectory. For example, in one scenario, for a road segment having four or more lanes, the probability of staying in the same lane in the interval between consecutive instances of probe information/data may be 75%; the probability of changing to a neighboring lane (e.g., one lane to the left or one lane to the right) in the interval between consecutive instances of probe information/data may be 10% for changing lanes to the right and 10% for changing lanes to the left; and the probability of changing to a lane that is not a neighboring lane (e.g., the vehicle 5 must pass through an intermediate lane on the way to the resulting lane) is 5%. The total of the lane change probabilities for a scenario is 100%. An example technique of analyzing a probe trajectory using lane change probabilities is described in more detail elsewhere herein. FIG. 5 illustrates an example lane level trajectory 70. The lane level trajectory 70 comprises a plurality of locations 65 that have been matched to lanes. For example, the color of the dots indicating the locations 65 corresponds to the lane the vehicle 5 was in when the corresponding instance of probe information/data was generated and/or provided as the vehicle was traveling along the road segment 50. Thus, the instances of probe information/data of a sequence instances of probe information/data may be lane level map-matched.

Lane level traffic information/data may then be determined based on one or more lane level trajectories. For example, once it is determined which lane an instance of probe information/data corresponds to, the instances of probe information/data may be used to determine lane level traffic information/data. For example, a lane specific average or other representative speed and/or a corresponding standard deviation of speed or other speed distribution description may be determined for one or more lanes of the road segment. In an example embodiment, a lane specific traffic volume measurement, lane specific alerts, lane specific traffic jam information/data, and/or the like for one or more lanes of the road segment may be determined.

At block 116 of FIG. 3, lane level traffic information/data is provided. For example, the lane level traffic information/data may be provided as part of a lane level traffic information/data notification. For example, the apparatus 10 may provide one or more lane level traffic information/data notifications to one or more computing entities 35. For example, the apparatus 10 may comprise means, such as processor 12, communications interface 16, and/or the like, for providing one or more lane level traffic information/data notifications to one or more computing entities 35. In an example embodiment, the lane level traffic information/data notification may comprise at least a portion of the determined lane level traffic information/data. In an example embodiment, the lane level traffic information/data notification comprises an updated map tile, a traffic information/data map tile layer, and/or the like. For example, a computing entity 35 may be a probe apparatus 20 (e.g., corresponding to a vehicle 5 that is approaching the road segment, expected to travel along the road segment on a current trip or an expected trip, currently travelling along the road segment, and/or the like) or a traffic management apparatus. For example, the computing entity 35 may be a traffic management apparatus that is operated by and/or on behalf of a traffic management agency (e.g., a local department of transportation, city traffic management office, and/or the like). In an example embodiment, a lane level traffic information/data notification provided (e.g., transmitted) to a computing entity 35 that is a probe apparatus 20 traveling along the road segment may comprise a lane identifier configured to identify the lane which the corresponding vehicle 5 is currently traveling in (as of the last instance of probe information/data received by the apparatus 10). In example embodiments, the lane level traffic information/data may comprise computer-executable code and/or reference computer-executable code that, when executed by the computing entity 35 may cause the computing entity 35 to provide one or more lane level alerts through a user interface thereof (e.g., a display, audible alert, and/or the like). For example, the speed of traffic in Lane 1 may be considerably slower than the traffic in Lanes 2 and 3 at a location a short distance ahead of the vehicle's 5 current location. Thus, a lane level alert may be provided indicating that the speed of traffic in Lane 1 is considerably slower than the traffic in Lanes 2 and 3 ahead. Various lane level alerts may be provided, as appropriate for the application. In an example embodiment, the computing entity 35 may, responsive to receiving the lane level traffic information/data notification and/or in response to executing the computer-executable therein and/or referenced thereby, perform one or more lane level navigation tasks based on the lane level traffic information/data. For example, one or more route planning computations, determinations, and/or the like may be performed that take into account the lane level traffic information/data and provide lane level directions and/or determinations for the route. For example, a route planning computation, determination, and/or the like may comprise re-calculating a route, determining an updated travel and/or expected arrival time, and/or the like.

Embodiments of the present invention allow the use of probe information/data to determine lane level traffic information/data. In example embodiments, lane level traffic information/data is determined in real time or near real time. For example, example embodiments allow for the determination of lane level traffic information/data based on GPS location data despite the GPS location data having a 95% confidence interval that is approximately twice the width of a lane.

As described above, the apparatus 10 is configured to determine the lane traveled by a vehicle 5 and/or the corresponding probe apparatus 20. However, in an example embodiment, a probe apparatus 20 may use a technique similar to that described above to determine the lane currently being traveled in by the probe apparatus 20 and/or the corresponding vehicle 5. For example, a map and/or a tile of a map stored by the probe apparatus 20 (e.g., in memory 24) may comprise a vehicle lane pattern for one or more road segments within the geographical area represented by the map and/or tile of the map. In an example embodiment, the probe apparatus 20 may store (e.g., in memory 24) a vehicle lane pattern for one or more road segments independent of a map and/or map tile and/or the probe apparatus 20 may access and/or receive a vehicle lane pattern provided by the apparatus 10. Thus, as should be understood based on the above, the probe apparatus 20 may use the vehicle lane pattern to determine the lane that the probe apparatus 20 and/or the corresponding vehicle 5 is currently in.

Analyzing a Probe Trajectory

A non-limiting example technique of analyzing a probe trajectory using lane change probabilities to determine a lane level trajectory, in accordance with an example embodiment, will now be described with respect to FIG. 6. FIG. 6 is a flowchart providing some processes and procedures for analyzing a probe trajectory using lane change probabilities to determine a lane level trajectory and/or lane level traffic information/data, in accordance with an example embodiment.

Starting at block 202, a hidden Markov model (HMM) is built based on the probe trajectory. For example, the apparatus 10 may build a HMM based on the probe trajectory. For example, the apparatus 10 may comprise means, such as the processor 12 and/or the like, for building an HMM based on the probe trajectory. In general, an HMM is a statistical Markov model in which the system being modeled is assumed to be a Markov chain with unobserved (e.g., hidden) states. In particular, the possible states of the HMM correspond to the lanes of the road segment as described by the vehicle lane pattern. The state probabilities correspond to the probability that a lane exists. Given the vehicle lane pattern and/or other known information/data corresponding to the road segment, the probability that a particular lane exists on the road segment is 100%. The possible observations of the MINI correspond to the data parameters, matched lanes, and/or lane probabilities of the probe trajectory. The state transition probabilities of the HMM correspond to the lane change probabilities. As noted above the lane change probabilities may be based on apriori information/data, historical probe information/data, and/or the like. The output and/or emission probabilities of the HMM correspond to the probability of the vehicle traveling a particular lane at the time each instance of the sequence of instances of probe information/data was captured and/or provided and will provide the lane level trajectory. For example, FIG. 7 shows an example trellis diagram 80 illustrating the HMM for a road segment having k lanes and probe trajectory corresponding to m instances of probe information/data.

Returning to FIG. 6, at block 204, the lane level trajectory corresponding to the input probe trajectory is obtained by determining and/or solving for the Viterbi-path for the HMM. For example, the apparatus 10 may obtain the lane level trajectory corresponding to the probe trajectory by determining and/or solving for the Viterbi-path of the HMM. For example, the apparatus 10 may comprise means, such as the processor 12 and/or the like, for obtaining the lane level trajectory corresponding to the probe trajectory by determining and/or solving for the Viterbi-path of the HMM. For example, the Viterbi algorithm may be used to determine and/or solve for the Viterbi-path of the HMM. For example, $V_{P_i,Ln} = \max_{x \in X}(P(d_i|Ln) \cdot a_{x,Ln} \cdot V_{P_{i-1},x})$, wherein $V_{Pi, Ln}$ is the value (or the optimal probability) of a vehicle being in a particular lane when the corresponding probe apparatus 20 generated and/or provided probe information/data instance i, x is a lane in the set of lanes X (wherein the set of lanes X is defined by the vehicle lane pattern), $P(d_i|Ln)$ is the probability that an observation of distance parameter d at probe information/data instance i of the probe trajectory is observed when the corresponding vehicle 5 is in lane Ln, and $a_{x,Ln}$ is the lane change probability from lane x to lane Ln. For the first point in the probe trajectory, $V_{P_1,k} = (P(d_1|k) \cdot \pi_k)$ where $\pi_k$ is the initial probabilities of being in lane k (e.g., the general probability that a vehicle may be in a particular lane, the (normalized) lane probabilities for the first instance of probe information/data of the sequence, and/or the like). In an example embodiment, $\pi_k$ may be determined based on historical probe information/data, lane level volume information/data from a previous determination of lane level traffic information/data (e.g., the immediately previously determined lane level traffic information/data), the lane probabilities corresponding to the sequence of instances of probe information/data corresponding to the probe trajectory, and/or the like. Back-tracing the Viterbi-path, the sequence of states across the link corresponding to the road segment can be obtained and the final output would be a sequence of lanes corresponding to the path traveled by the vehicle 5 for which the corresponding probe trajectory is being analyzed. In an example embodiment, the emission probabilities P($d_i$|Ln) can be computed using the relevant vehicle lane pattern (e.g., stored in memory 14) and the matched lane and/or lane probabilities determined at block 108. For example, the representative distance parameter (e.g., average distance parameter) and distribution description (e.g., standard deviation) of the relevant vehicle lane pattern may be used to compute the emission probabilities P($d_i$|Ln). For example, assuming that the probes are distributed following a Gaussian distribution, we can compute the emission probabilities P($d_i$|Ln) using the Gaussian density function:

$$P(d_i | \mu_{Ln}, \sigma^2_{Ln}) = \frac{1}{\sqrt{2\sigma^2_{Ln}\pi}} e^{-\frac{(d_i - \mu_{Ln})^2}{2\sigma^2_{Ln}}},$$

wherein $\mu_{L_n}$ is the representative distance parameter for lane Ln and $\sigma_{L_n}$ is the distribution description of the distance parameter for lane Ln, as provided by the vehicle lane pattern. As noted above, the lane change probability $a_{x,L_n}$ is designed account for the assumption that vehicles usually stay on the same lane and that lane changes are rare compared to the number of instances of probe information/data. Thus, the Viterbi-path for a HMM built on a probe trajectory may be obtained, wherein the Viterbi-path is a likely sequence of lanes for each instance of probe information/data in the sequence of instances of probe information/data. In an example embodiment, the lane level trajectory is defined based on the Viterbi-path corresponding to the probe trajectory. Hence the probe trajectory is map-matched at lane level to provide a lane level trajectory. In an example embodiment, a plurality of lane level trajectories may be determined, wherein each lane level trajectory is determined based on a probe trajectory.

At block 206, lane level traffic information/data is determined based on a plurality of lane level trajectories. For example, based on the lane level trajectory, each instance of probe information/data may be assigned a lane. The plurality of instances probe information/data may then be segmented based on the lane assigned to each instance of probe information/data. For example, the instances of the plurality of instances of probe information/data assigned to Lane 1 may be partitioned into a first segment, the instances of the plurality of instances of probe information/data assigned to Lane 2 may be partitioned into a second segment, and/or the like. Each partition or segment of the instances of probe information/data corresponding to a particular lane of the road segment may be analyzed to determine traffic level information/data. For example, a lane specific representative speed (e.g., average speed), a lane specific speed distribution description (e.g., standard distribution of speeds), a lane specific measure of the volume of traffic, and/or the like may be determined.

III. Example Apparatus

The probe apparatus 20, computing entity 35, and/or apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the probe apparatus 20, computing entity 35, and/or apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In this regard, FIG. 2A depicts an apparatus 10 and FIG. 2B depicts a probe apparatus 20 of an example embodiment that may be embodied by various computing devices including those identified above. As shown, the apparatus 10 of an example embodiment may include, may be associated with or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22, and a memory device 24, and optionally a communication interface 26, a user interface 28, one or more sensors 30 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In example embodiments, a computing entity 35 may, similar to the apparatus 10 and/or probe apparatus 20, comprise a processor, memory device, communication interface, user interface, and/or one or more additional components configured to perform various operations, procedures, functions, or the like described herein. In an example embodiment, a computing entity may comprise one or more sensors similar to the one or more sensors 30.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10, computing entity 35, and/or probe apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10, computing entity 35, and/or probe apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The apparatus 10, computing entity 35, and/or the probe apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10, computing entity 35, and/or probe apparatus 20 of an example embodiment, a navigation system may also include or have access to a geographic database that includes a variety of data (e.g., map information/data) utilized in constructing a route or navigation path, determining the time to traverse the route or navigation path, matching a geolocation (e.g., a GNSS determined location) to a point on a map and/or link, and/or the like. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the probe apparatus 20 and/or computing entity 35 may be configured to execute computer-executable instructions provided by and/or referred to by a data record. In an example embodiment, the apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more probe apparatuses.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10, computing entity 35, and/or probe apparatus 20 in accordance with an example embodiment may determine the time to traverse a route that includes one or more turns at respective intersections more accurately.

IV. Apparatus, Methods, and Computer Program Products

As described above, FIGS. 3 and 6 illustrate flowcharts of apparatuses 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a plurality of instances of probe data, wherein an instance of probe data comprises location information indicating a location of a corresponding probe apparatus;
   for each of one or more instances of the plurality of instances of probe data, determining a distance parameter based on the location information and a road segment corresponding to the location;
   identifying a most likely lane for each instance of the plurality of instances based on the corresponding distance parameter;
   constructing one or more probe trajectories based on one or more sequences of instances of probe data identified in the plurality of instances of probe data;
   analyzing at least one of the one or more probe trajectories based at least in part on lane change probabilities to generate at least one lane level trajectory;
   determining lane level traffic information based on the at least one lane level trajectory; and
   providing at least a portion of the lane level traffic information configured for use in performing at least one navigation-related function.

2. The method of claim 1, wherein the most likely lane for each instance of the plurality of instances is identified based on a vehicle lane pattern determined by clustering historical probe data.

3. The method of claim 2, wherein the most likely lane for an instance of probe data is determined based at least in part on representative distance parameters of the vehicle lane pattern and the distance parameter for the instance of probe data.

4. The method of claim 1, wherein:
   each instance of probe data comprises (a) a probe apparatus identifier configured to identify the probe apparatus and (b) a timestamp,
   each instance of probe data in a sequence of instances of probe data comprises a common probe identifier, and
   the sequence of instances of probe data is sequenced based on the time stamps of the instances of probe data in the sequence.

5. The method of claim 1, wherein analyzing the at least one of the one or more probe trajectories comprises:
   generating a hidden Markov model based on the at least one of the one or more probe trajectories and the lane change probabilities;
   obtaining a Viterbi-path corresponding to the at least one of the one or more probe trajectories; and
   defining a lane level trajectory based on the Viterbi-path.

6. The method of claim 1, wherein the lane level traffic information comprises at least one of:
   a lane specific representative travel speed,
   a lane specific distribution description of travel speed,
   a lane specific traffic volume measurement,
   a lane specific alert,
   lane specific traffic jam information, or
   a current lane for a particular vehicle.

7. The method of claim 1, wherein a sequence of instances of probe data comprises at least three instances of probe data.

8. The method of claim 1, wherein the distance parameter is determined by:
   identifying a position on a link of a digital map corresponding to the road segment based on the location information;
   determining a distance between the position on the link and the location of the instance of probe data; and
   assigning the distance parameter the value of the determined distance.

9. The method of claim 8, wherein the position is located on a reference line corresponding to the road segment and the distance is equal to the length of a line extending from the position to the location, wherein the line is perpendicular to the reference line.

10. The method of claim 1, wherein the lane change probabilities are determined based on historical probe data or apriori data.

11. An apparatus comprising at least one processor and at least one memory storing computer program code, with the at least one memory and the computer program code configured to, with the processor, cause the apparatus to at least:
    receive a plurality of instances of probe data, wherein an instance of probe data comprises location information indicating a location of a corresponding probe apparatus;
    for each of one or more instances of the plurality of instances of probe data, determine a distance parameter based on the location information and a road segment corresponding to the location;
    identify a most likely lane for each instance of the plurality of instances based on the corresponding distance parameter;
    construct one or more probe trajectories based on one or more sequences of instances of probe data identified in the plurality of instances of probe data;
    analyze at least one of the one or more probe trajectories based at least in part on lane change probabilities to generate at least one lane level trajectory;
    determine lane level traffic information based on the at least one lane level trajectory; and
    provide at least a portion of the lane level traffic information configured for use in performing at least one navigation-related function.

12. The apparatus of claim 11, wherein the most likely lane for each instance of the plurality of instances is identified based on a vehicle lane pattern determined by clustering historical probe data.

13. The apparatus of claim 12, wherein the most likely lane for an instance of probe data is determined based at least in part on representative distance parameters of the vehicle lane pattern and the distance parameter for the instance of probe data.

14. The apparatus of claim 11, wherein:
each instance of probe data comprises (a) a probe apparatus identifier configured to identify the probe apparatus and (b) a timestamp,
each instance of probe data in a sequence of instances of probe data comprises a common probe identifier, and
the sequence of instances of probe data is sequenced based on the time stamps of the instances of probe data in the sequence.

15. The apparatus of claim 11, wherein analyzing the at least one of the one or more probe trajectories comprises:
generating a hidden Markov model based on the at least one of the one or more probe trajectories and the lane change probabilities;
obtaining a Viterbi-path corresponding to the at least one of the one or more probe trajectories; and
defining a lane level trajectory based on the Viterbi-path.

16. The apparatus of claim 11, wherein the lane level traffic information comprises at least one of:
a lane specific representative travel speed,
a lane specific distribution description of travel speed,
a lane specific traffic volume measurement,
a lane specific alert,
lane specific traffic jam information, or
a current lane for a particular vehicle.

17. The apparatus of claim 11, wherein a sequence of instances of probe data comprises at least three instances of probe data.

18. The apparatus of claim 11, wherein the distance parameter is determined by:
identifying a position on a link of a digital map corresponding to the road segment based on the location information;
determining a distance between the position on the link and the location of the instance of probe data; and
assigning the distance parameter the value of the determined distance.

19. The apparatus of claim 18, wherein the position is located on a reference line corresponding to the road segment and the distance is equal to the length of a line extending from the position to the location, wherein the line is perpendicular to the reference line.

20. A computer program product comprising at least one non-transitory computer-readable storage medium having computer-executable program code instructions stored therein with the computer-executable program code instructions comprising program code instructions configured to:
receive a plurality of instances of probe data, wherein an instance of probe data comprises location information indicating a location of a corresponding probe apparatus;
for each of one or more instances of the plurality of instances of probe data, determine a distance parameter based on the location information and a road segment corresponding to the location;
identify a most likely lane for each instance of the plurality of instances based on the corresponding distance parameter;
construct one or more probe trajectories based on one or more sequences of instances of probe data identified in the plurality of instances of probe data;
analyze at least one of the one or more probe trajectories based at least in part on lane change probabilities to generate at least one lane level trajectory;
determine lane level traffic information based on the at least one lane level trajectory; and
provide at least a portion of the lane level traffic information configured for use in performing at least one navigation-related function.

* * * * *